US012808972B2

(12) United States Patent
Gibbons

(10) Patent No.: US 12,808,972 B2
(45) Date of Patent: Nov. 24, 2026

(54) SYSTEMS AND METHODS FOR TAG LOCALIZATION

(71) Applicant: Gregory Dean Gibbons, San Mateo, CA (US)

(72) Inventor: Gregory Dean Gibbons, San Mateo, CA (US)

( * ) Notice: Subject to any disclaimer, the term of this patent is extended or adjusted under 35 U.S.C. 154(b) by 663 days.

(21) Appl. No.: 18/328,595

(22) Filed: Jun. 2, 2023

(65) Prior Publication Data

US 2023/0393232 A1 Dec. 7, 2023

Related U.S. Application Data

(60) Provisional application No. 63/365,830, filed on Jun. 3, 2022.

(51) Int. Cl.
*G01S 5/02* (2010.01)
*G01S 5/14* (2006.01)

(52) U.S. Cl.
CPC ............ *G01S 5/0249* (2020.05); *G01S 5/145* (2013.01)

(58) Field of Classification Search
CPC ....... G01S 5/0249; G01S 5/145; H04W 4/029
See application file for complete search history.

(56) References Cited

U.S. PATENT DOCUMENTS 3,128,465 A * 4/1964 Brilliant ................ H03L 7/0816 340/870.18
4,881,040 A * 11/1989 Vaughn .................... H03K 3/78 377/56
5,241,313 A * 8/1993 Shaw ........................ G01S 3/02 342/13
6,836,226 B2 * 12/2004 Moore .................... H03M 5/08 341/59
2012/0155569 A1 * 6/2012 Ward ........................ G01S 5/14 375/295
2019/0293806 A1 * 9/2019 Haley ................... G01S 5/0036
2021/0152978 A1 * 5/2021 Peyrotte ................ G01S 5/0081
2022/0397682 A1 * 12/2022 Saunders ................ G01S 19/06

* cited by examiner

*Primary Examiner* — Cassi J Galt
(74) *Attorney, Agent, or Firm* — DLA PIPER LLP (US)

(57) ABSTRACT

The disclosed embodiments include systems and methods for tag localization.

17 Claims, 10 Drawing Sheets

$$X = (x\ y\ z)$$

X is the unknown tag position, in three dimensions $$S_i = (x_i\ y_i\ z_i)$$

$S_i$ is the receiver position at time i $$r_i^2 = (-x_i + x)^2 + (-y_i + y)^2 + (-z_i + z)^2$$

The range from the tag to the receiver is the time of flight of the signal (TOF) times the speed of light, c:

$$r_i = TOF_i c$$

The TOF of the signal is the time of arrival (TOA) less the time of transmission (TOT)

$$TOF_i = TOA_i - TOT_i$$

So, substituting, $$r_i = c\,(TOA_i - TOT_i)$$

Assuming initial clock bias cb, no clock drift and known time intervals Δ

$$TOT_i = cb + i\ \Delta$$

That is, the $i^{th}$ time of transmission is the clock bias at time zero plus i times the known interval Δ

Then we know that $$r_i = c\,(TOA_i - cb - \Delta\ i)$$

So finally we have an equation for each reception i, involving only one time unknown, namely cb, and the entire set of equations has just four unknowns, y, z and cb.:

$$\left(c\left[TOA_i - cb - \Delta\ i\right]\right)^2 = (-x_i + x)^2 + (-y_i + y)^2 + (-z_i + z)^2$$

This equation is similar to the usual GPS equation, in which the receiver collects signals from multiple satellites at the same time, hence all equations share the same cb, which is the receiver device's clock bias.

$$\left(c\left[TOA_i - cb\right]\right)^2 = (-x_i + x)^2 + (-y_i + y)^2 + (-z_i + z)^2$$

GPS therefore solves a set of simultaneous equations having four variables, x, y, z and cb.

We can deal with a linear clock rate drift $d_{ck}$ by adding it as a new variable, obtaining a set of simultaneous equations with five variables, y, z, cb and $d_{ck}$:

$$\left(c\left[TOA_i - cb - \{\Delta + d_{ck}\}i\right]\right)^2 = (-x_i + x)^2 + (-y_i + y)^2 + (-z_i + z)^2$$

FIG. 10

SYSTEMS AND METHODS FOR TAG LOCALIZATION

CROSS-REFERENCE TO RELATED APPLICATIONS

This application claims priority to U.S. Provisional Application No. 63/365,830, filed Jun. 3, 2022, which is herein incorporated by reference in its entirety.

BACKGROUND OF THE DISCLOSURE

PNT (positioning, navigation and timing) systems often involve satellites. The most broadly known example is GPS (global positioning system), which uses synchronized satellite transmitters to enable user equipment to determine its position, typically including latitude, longitude, altitude, and time. Legacy systems for PNT include long range navigation (LORAN), various aircraft navigation aids, etc., which typically use fairly narrow band RF signals. GPS and other more modern systems use variations of spread spectrum RF technology (typically wider band) with various encoding schemes and techniques of sharing access, such as time division and frequency division multi-access and code division multi-access.

In satellite navigation, localization functions are accomplished using transmitters belonging to the positioning system (e.g. GPS satellites) to send signals to user equipment (e.g. GPS receivers in cell phones), and the user equipment processes these signals to obtain position and time correction estimates. GPS and several other satellite navigation systems (i.e., GLONAS, GALILEO, BeiDou, etc.) use this architecture.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

FIG. 10 shows equations relating the Euclidean range from tag position (x,y,z) to satellite position at the times of the ith reception ($x_i$, $y_i$, $z_i$) as the actual range $r_i$, which is $c^*(TOA_i\text{-}TOT_i)$, wherein the unknowns are x, y, z and clock bias cb, and optionally clock bias rate $d_{cb}$, according to some embodiments of the present disclosure.

DESCRIPTION

Figure 1:
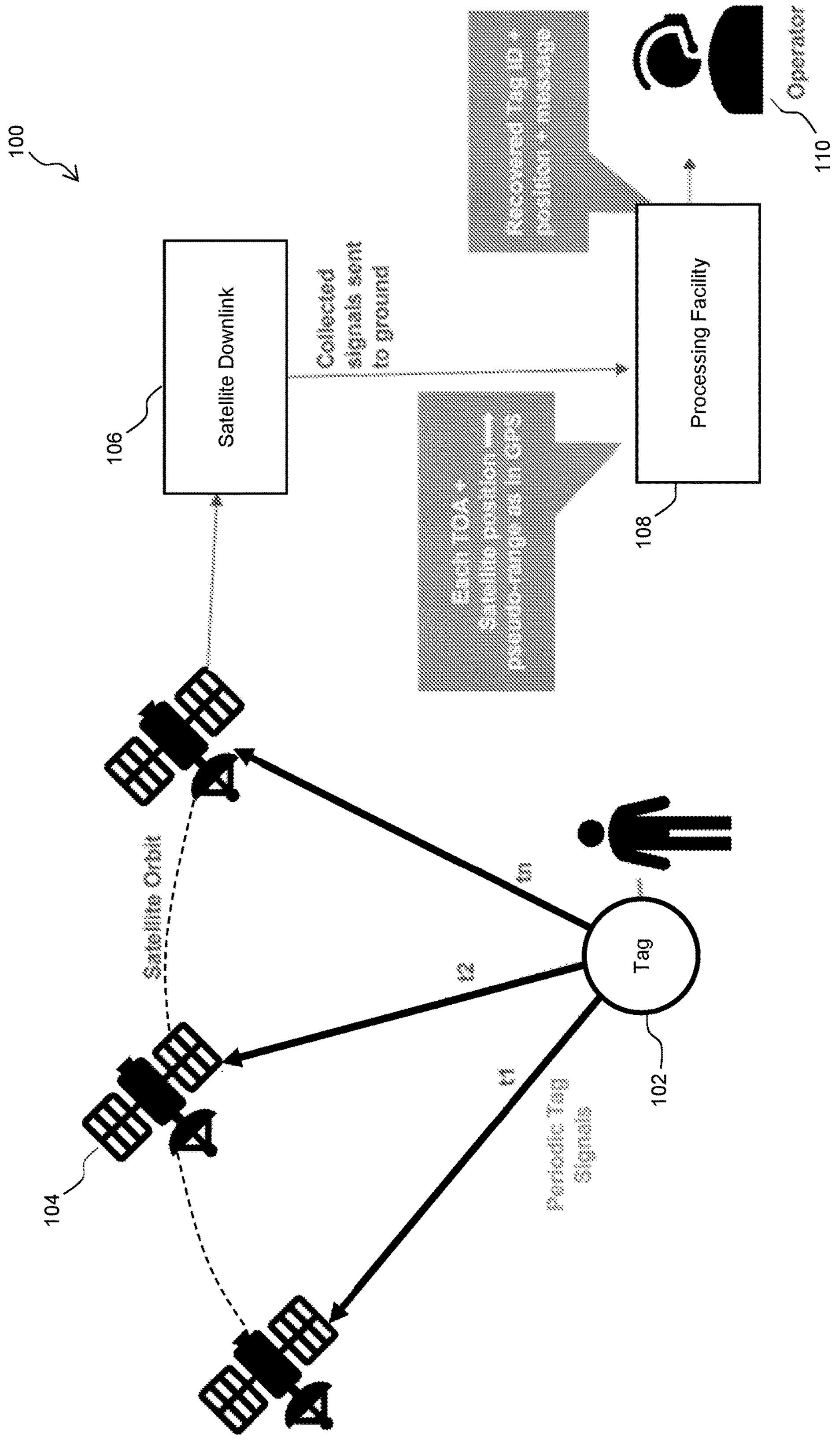
FIG. 1 is an example system for tag localization according to some embodiments of the present disclosure.

The following detailed description is merely exemplary in nature and is not intended to limit the invention or the applications of its use.

Some systems, such as some RF tracking systems for monitoring wildlife, employ a so-called "reverse-GPS" technique in which the subject animal is tagged with a small RF transmitter. In these systems, several synchronized receivers in known locations are placed so that a plurality of receivers hopefully collect the same signal and note the time of arrival (TOA) of the signal. Should at least three such receivers, in known positions and suitably synchronized, collect a particular tag signal, then each such reception constitutes what is called a pseudo-range (in GPS, a direct range measurement based on the time of flight of a signal whose dominant error is a clock bias). Those skilled in the art will recognize that at least four such receivers are used for full PNT, and that using only three would restrict the solution to two dimensions. For wildlife tracking altitude is irrelevant, and the possible reduction of precision while relying on only three receivers is unimportant in wildlife application. Given at least three pseudo-ranges for the same transmitted signal, it is possible to apply the GPS calculation to derive the position of the transmitting tag. Thus, the system is similar to GPS except that the transmitter is the device to be located, instead of some satellites. That is, the role of transmitter and receiver is reversed but the calculation is similar or the same.

In current PNT systems, complex user equipment may make use of infrastructure of diverse systems, such as supplementing GPS signals with LORAN signals, in order to maintain a PNT capability of the system should GPS or other supporting signals be unavailable.

Embodiments of the present disclosure relate to a PNT system that may enable covert worldwide tagging/tracking and limited covert communication, without dependence on local infrastructure, in areas without GPS or cell service, etc. The disclosed system, which can operate in a "reverse-GPS fashion," can include user equipment that transmits signals, which can be recovered by use of one or more existing (or future) collection systems (e.g., satellites or local communication systems). The signals in combination can be used to obtain information about the transmitter, such as position, motion, encoded information bits (timing information, message information, etc.), and clock correction. In some embodiments, a plurality of pseudo-ranges can be collected over a time interval which are used to locate and/or track a user device. The disclosed user device may be configured to precisely time its transmissions at intervals known to the receiver(s), enabling the receiving system to localize the transmitter using data over a plurality of times while requiring only one unknown time parameter. By using transmissions at precisely timed intervals, the separate unknown clock biases inherent in previous pseudo-range calculations collected at different times can now be resolved into a single clock bias, thus becoming a collection of pseudo-ranges having only a single unknown clock bias. Additionally, in some embodiments, the disclosed principles can be configured to be used in conjunction with current PNT systems and/or as a backup when GPS or other PNT systems fail or become unavailable.

Figure 6:
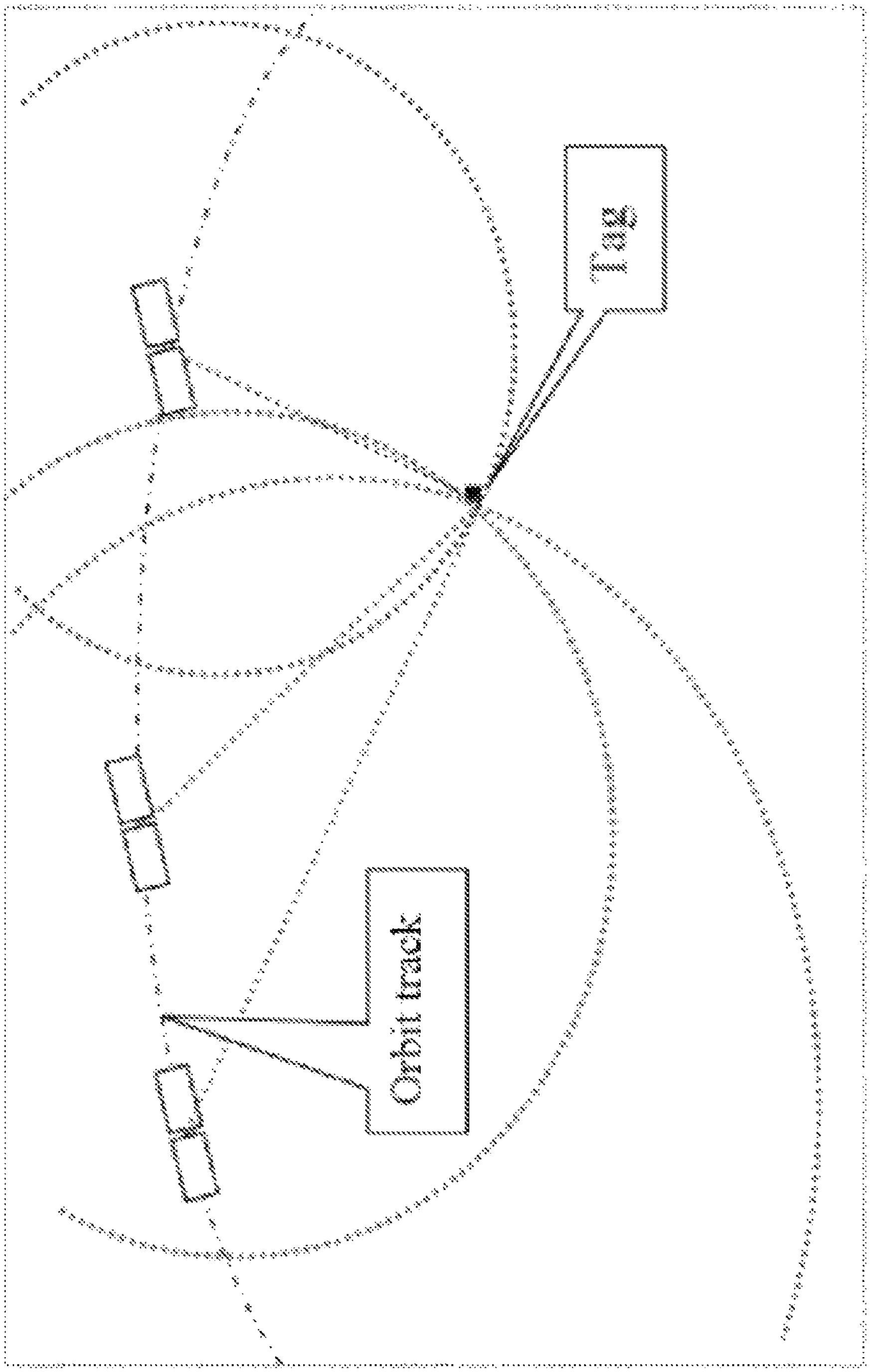
FIG. 6 is an example visualization of how circles or spheres of radius equal to the range from a satellite to a tag and centered at the satellite at various times can intersect at the location of the tag according to some embodiments of the present disclosure.
Figure 7:
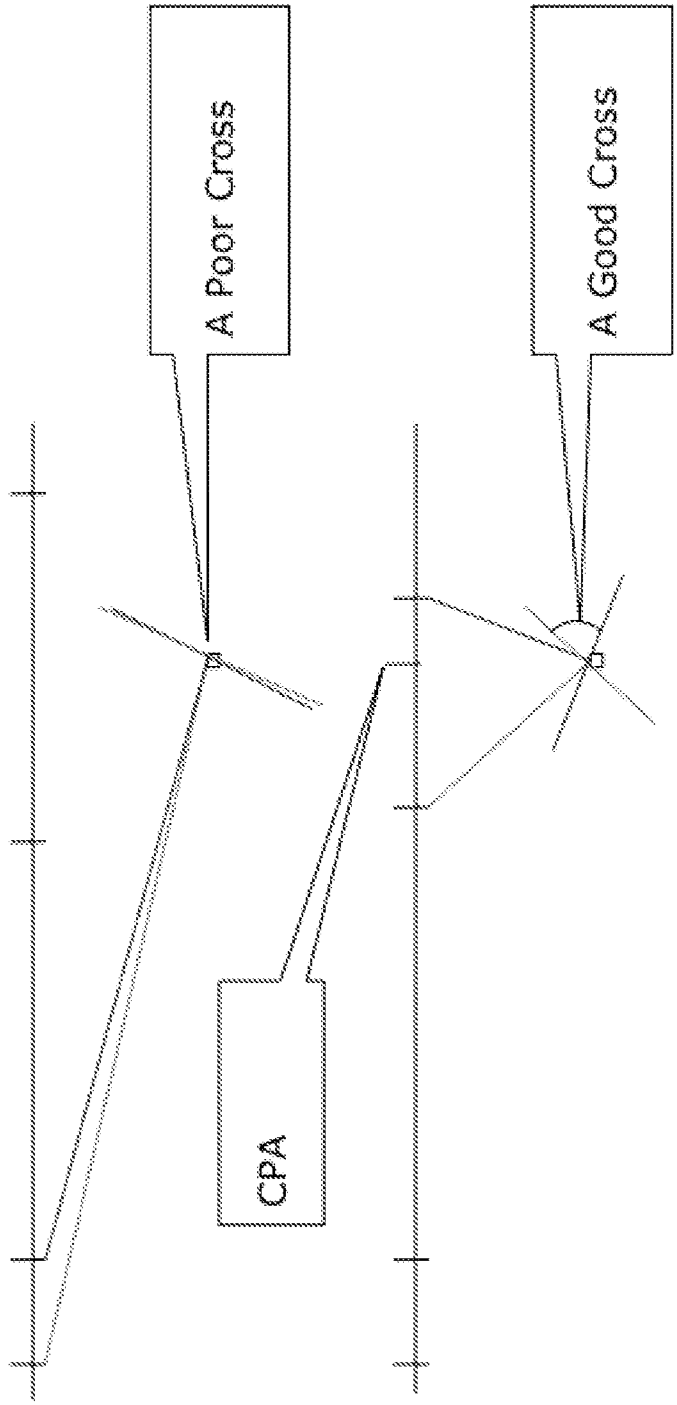
FIG. 7 is an example visualization of how pseudo-ranges from a plurality of satellite locations, once the clock bias is resolved, can intersect (or cross) near the transmitter location, according to some embodiments of the present disclosure.
Figure 8:
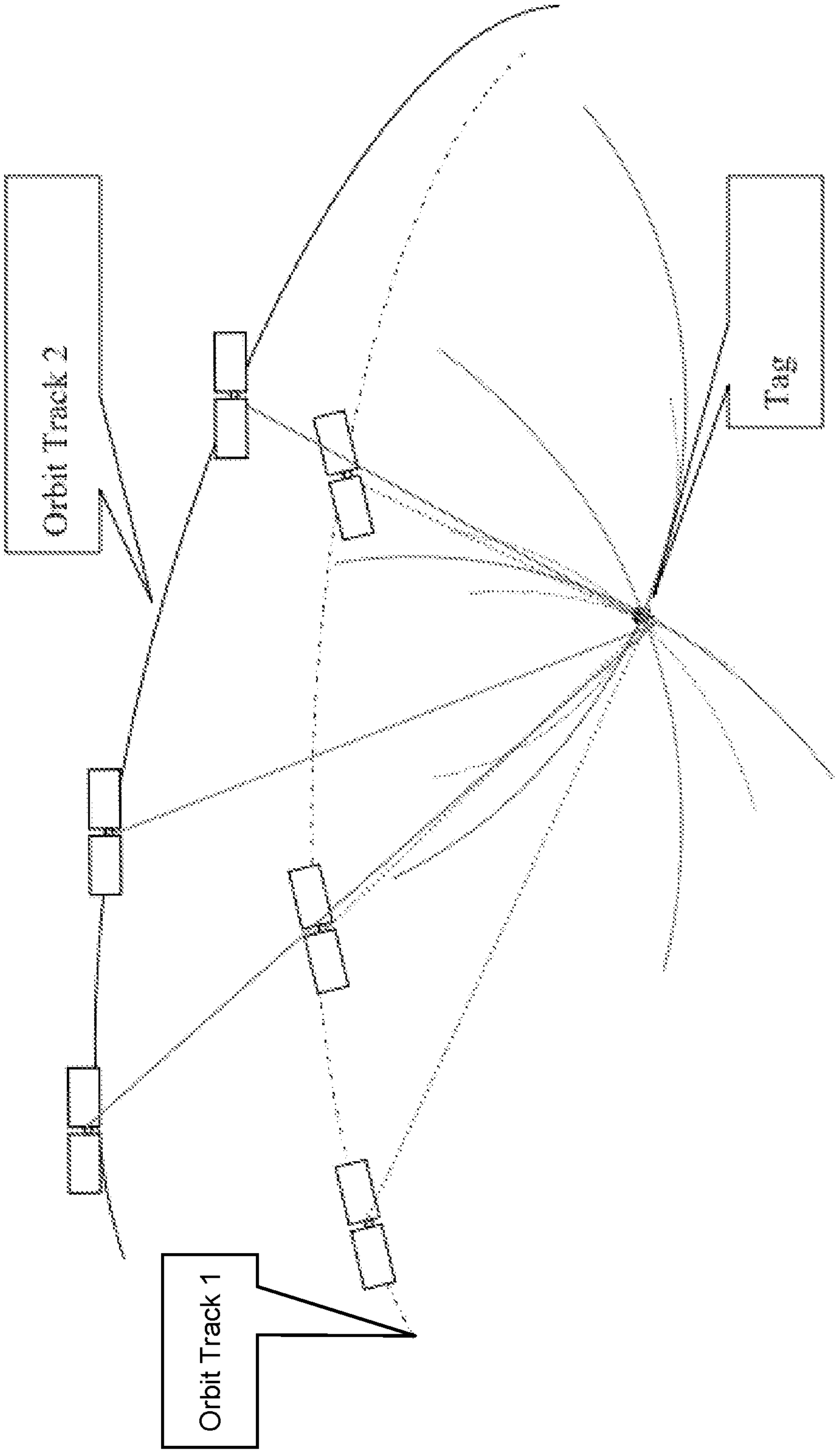
FIG. 8 is an example visualization of a plurality of satellites localizing a tag according to some embodiments of the present disclosure.

According to the disclosed principles, if pseudo-ranges could be obtained for a transmitter on the surface from a single satellite as it passes by its closest point of approach (CPA) to the transmitter, then a good estimate of the position could be obtained. Further from the CPA, the geometric dilution of precision (GDOP) would increase and good positioning would be more difficult to determine. If the disclosed transmitter were to transmit at exact (or near exact, such as accurate on a nanosecond scale) intervals, say Δ, then a series of transmissions collected by a passing satellite (or other device/vehicle/system) would have, in effect, only one unknown TOT, each being different from that of another by an integer number of intervals Δ. Example illustrations and additional discussion of CPA are shown in FIGS. 6-8. Should the receiver miss a transmission subsequent to a received transmission, if the interval Δ is a substantial fraction of a second (e.g., 0.1 seconds or more), then there will be no ambiguity about the number of missed transmissions, since transmission times will fall into unique intervals of duration Δ. That is, each time interval corresponds to a range difference of say 0.1c, or about 3e7 meters. Similarly, the intervals in use need not be identical—a series of intervals differing one from another would serve the same purpose, if known by both transmitter and receiver. In some embodiments, with unequal intervals, only the correctly synched time estimate may result in a set of pseudo-ranges that converge on a legitimate position estimate. Otherwise, the circles or spheres resulting from the time corrections could be very far from intersecting at a single point FIG. 1 is an example system 100 for tag localization according to some embodiments of the present disclosure. The system 100 may include a tag device 102, which can be worn, carried, or otherwise attached to or connected to a user. This is an example only, however, and the tag device 102 can be used to track various objects or items that are not humans, such as packages, shipments, or any other object. The system 100 may also include a satellite 104 orbiting earth, a satellite downlink 106 to a processing facility 108 on the ground, where collected signals are processed to recover the tag ID, location, motion, and any included message bits for use by a system user 110.

The tag device 102 can be configured to transmit signals at very precisely known internals, such as intervals controlled by one or more various stable clocks (e.g., a chip scale atomic clock or other timing instrument of sufficient stability). For example, the tag device 102 could transmit signals at intervals of one second, which could be accurate to within about a few nanoseconds and have good drift characteristics. A one second interval is merely an exemplary value and many other intervals could be used provided the transmissions are precisely scheduled in a known manner. In some embodiments, instead of constant intervals, transmissions could be scheduled at varying intervals, the schedule being known to authorized receivers, and the receiver processing could include looking for intervals that correspond to the schedule in use, thus avoiding fixed intervals that could be exploited by unauthorized users. Some chip scale atomic clocks have drift rates of $1^{-10}$ or better. For the first transmission, the TOT could be on the one-second boundary reference of the clock on the tag device 102, but with an unknown offset from the clock of the satellite 104. For each successive transmission, the nth would be as follows:

$$TOT(n) = TOT(0) + n * \text{interval}$$

Thus, by transmitting at precise, known intervals, n unknown clock offsets can be reduced to a single unknown clock offset, namely TOT(0). Therefore, the satellite 104 can have collected enough information to calculate latitude, longitude, altitude, and clock bias of the tag device 102 using the same or similar algebra as is used in GPS systems. Some situations could occur in which for data collected from a single satellite, the user position and satellite track could result in a left-right ambiguity, which could be resolved using an initial estimate of the tag location, or including a pseudo-range collected by another receiver. The calculations may not necessarily be performed by the satellite 104. In some embodiments, the satellite 104 can pass the signals received from the tag device 102 to a downlink 106, said signals being collected and sent to a ground processing station for analysis and recovery. The tag device 102 can transmit any type of signal that supports high resolution time of arrival. In some embodiments, the transmitted signals can also include various information encoded therein that can help distinguish signals from other signals. Additional details and embodiments are discussed in relation to FIGS. 2-5.

In some embodiments, the method of calculating tag position from tag transmissions extending over multiple intervals can be refined to include an approximation of the clock drift. In practice there are often significant intervals in which the drift of chip scale atomic clocks is approximately linear. Thus by adding an additional variable, namely the estimated (constant) clock drift, each pseudo-range can be represented by an expression involving the original four unknowns (latitude, longitude, altitude, clock bias) plus the new variable, clock drift rate. The clock bias can be calculated as cb(i)=cb(0)+i*(Δ+drift rate).

Figure 2:
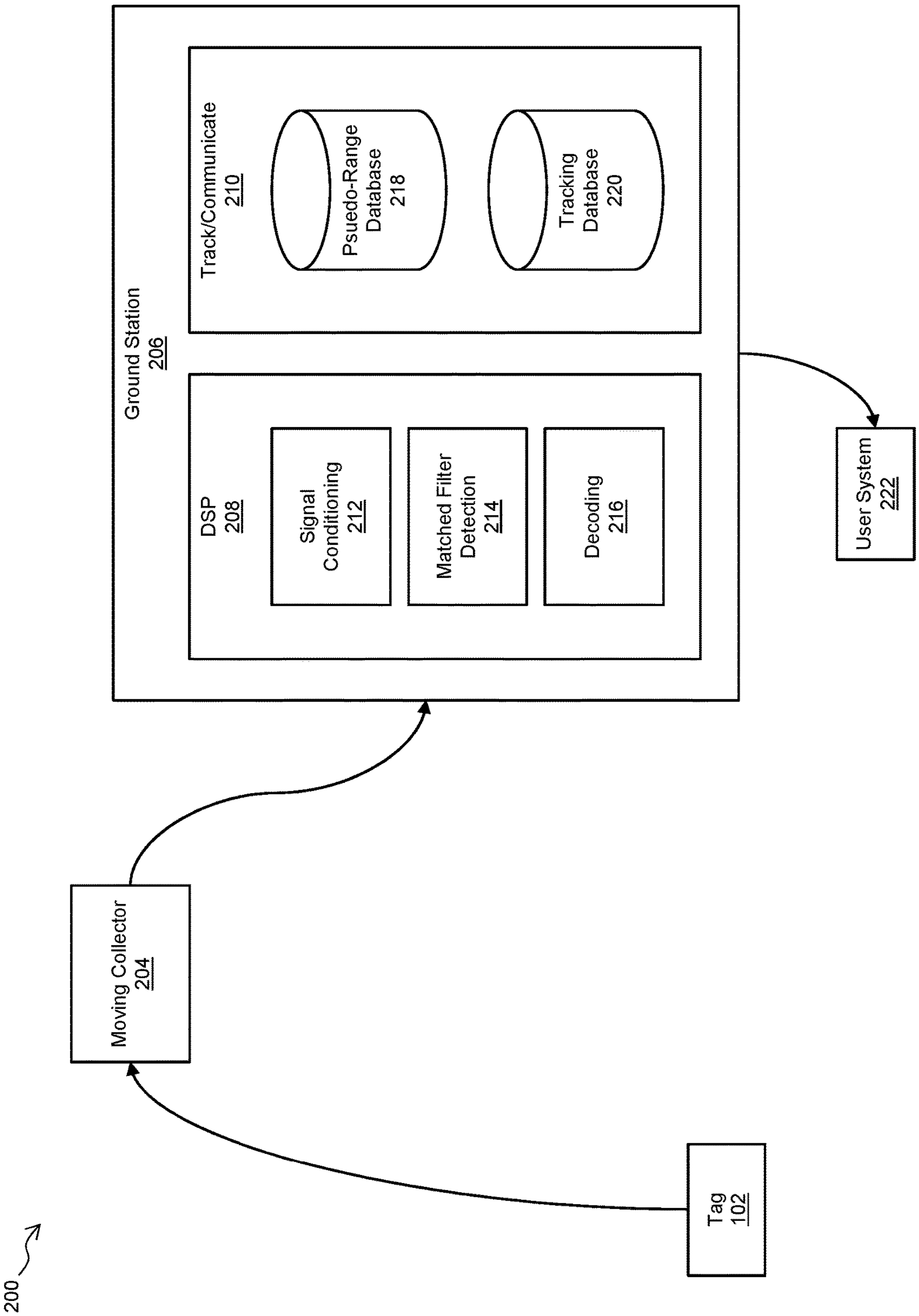
FIG. 2 is a block diagram of an example system for tag localization according to some embodiments of the present disclosure.

FIG. 2 is a block diagram of an example system 200 for tag localization according to some embodiments of the present disclosure. In some embodiments, the system 100 described in FIG. 1 can be a specific example of the system 200. System 200 may include user equipment, collection equipment, and processing equipment. In some embodiments, the collection and processing equipment can be parts of the same equipment (i.e., on the same device or system). The system 200 may include a tag 102. The tag 102 may include a transmitter configured to operate with the RF waveform in use and a stable internal clock capable of triggering transmissions at highly accurately known time intervals. Additional details and functionality with respect to the tag 102 are discussed in relation to FIG. 4.

The moving collector 204 (i.e., the collection system) may include one or more moving collector platforms with receivers configured to capture the tag signals. In some embodiments, receivers can be bent-pipe devices configured to collect signals at the frequency in which the tag 102 transmitted its signals, and frequency-shift the incoming energy to a new frequency suitable for downlinking to a ground station or cross linking to other collector platforms. The receivers can be accurately synchronized and have accurate ephemeris or time/position information onboard. Thus, each receiver can be configured to observe a pseudo-range for each signal received from the tag 102. The moving collector 204 can take various forms depending on the specific application. In some embodiments, such as the embodiment shown and discussed in FIG. 1, the moving collector 204 can be a satellite, an aircraft flying overhead, an unmanned aerial vehicle (UAV), or other similar type of vehicle that can possess reliable time and position information on itself. An example might be a rescue aircraft seeking an isolated person using a tag 102, with the entire receiver and processing system 108 onboard the moving collector 204. In some embodiments, the moving collector 204 itself can be configured to process the results. In some embodiments, the moving collector 204 can digitize the signals and transmit digitized signals to the ground station 206 for processing. In some embodiments, the system 200 can also include one or more stationary receivers to contribute to the collection of pseudo-ranges. Many factors affect the performance of such as system, including the stability of the clocks in use, the accuracy of ephemeris information about the moving platforms, the geometric distribution of the positions and the time spans over which the receptions are made, the character of the motion if any of the tag over the affected interval, etc., and that, furthermore, even if positioning accuracy is limited in a particular situation, such limitations can often be estimated, and that some functions such as limited covert communication and potentially important time transfer functions can still be supported.

During operation, the tag 102 may transmit its signals to the moving collector 204; the signals can include a tag identifier and message information. The moving collector 204 may capture the RF signals and transmit the signals to a ground station 206 (i.e., processing system). In some embodiments, the RF signals can be transmitted to the ground station 206 via bent-pipe receivers. The moving collector 204 can associate a collector identifier, position, and TOA with an analog signal. The ground station 206 can include a digital signal processing (DSP) station 208 which digitizes the incoming signal data and processes the digitized sample, including a signal conditioning module 212 that applies signal condition algorithms to the digitized signal, a matched filter detection module 214 to recover the signals sent, and a decoding module 216 to recover available information in a set of signals, including transmitter position, motion, and transmitted message information. In order for the DSP station 208 to process the signals, the ground station 206 can also include one or more analog receivers (i.e., an RF front end) to convert the antenna signals to an analog signal suitable for sampling. Furthermore, the ground station 206 can include an analog to digital converter (ADC) to produce the digital sample for use by the DSP station 208.

In some embodiments, the ground station 206 can also include a track/communicate station 210, which may be configured to correlate and maintain calculated pseudo-ranges with the tag identifiers (e.g., via a pseudo-range database 218 and a tracking database 220) so that tracking and communication can be managed, such as via display to a user system 222. User system 222 can include various computing devices, such as a laptop, computer, PDA, cell phone, tablet, etc.

An example embodiment of system 200 can be a search and rescue system. In such an embodiment, one or more tags 102 can be carried or attached to users involved in some activity in an environment where GPS or other navigational systems may not work well. The users could activate their tags 102 when needed (e.g., if they desire to be rescued) and the system 200 would monitor for the transmitted signals, and for any received provide near real-time updates to the user system 222. For example, a drone, UAV, or aircraft could be dispatched to fly over the general region where the users are located to receive the signals, or satellites overhead could receive the signals, or both. The signals would then be (in the case that the processing capabilities are on a separate system from the collection capabilities, which is not required) transmitted to the necessary processing equipment (i.e., ground station 206) for pseudo-range, location determination, and message recovery. The processed results can then be conveyed in real time to rescue assets who would be dispatched to retrieve the users. In a specific example, a single aircraft could accurately locate an activated tag by flying a suitable search pattern over a period of a few minutes, collecting dozens of pseudo-ranges from various directions from the tag and obtaining location accuracy comparable to GPS.

System 200 can be applied in various other embodiments. For example, a downlink by another communication system can be added to a device in which the tag 102 is implemented to inform the user of the collected location information and "close the loop." Closing the loop in this fashion would provide the user with a GPS-like capability to know their own location with accurate timing without reliance on local GPS or other supporting systems.

In addition, a single moving collector 204, such as an aircraft, could collect transmitted information from a large number of tags 102 (hundreds to even thousands) within its LOS (line of sight) and therefore determine pseudo-ranges for each tag 102 over an extended period of time. For example, the aircraft could collect transmitted signals using a wide angle antenna covering a surveillance area of interest. The aircraft could then shift the incoming RF signals in its band to another band and "bent-pipe" the shifted signal(s) to one or more ground stations, where the detection and processing would be accomplished to update a tracking and message database covering all participating tags in near real time. In this example, when applied to system 200, the system can include more than one ground station 206, and signals could be filtered to various ground stations 206 based upon access permissions, capabilities, interests, etc. In this fashion various user communities with different requirements and sensitivities could be served in the same area without mutual interference.

In addition, the system 200 can operate in parallel or as an adjunct to other systems, perhaps with tags that make use of GPS if GPS service is actually available. In other words, the system 200 could operate as a backup if GPS is unavailable. Such integration of systems could have the benefit of providing smooth transition from conventional operation to GPS-denied operation in case of need. Moreover, such a combined system could provide an ongoing real time validation of GPS, thus enabling quick and reliable recognition of interference or spoofing or active disruption of GPS.

Figure 3:
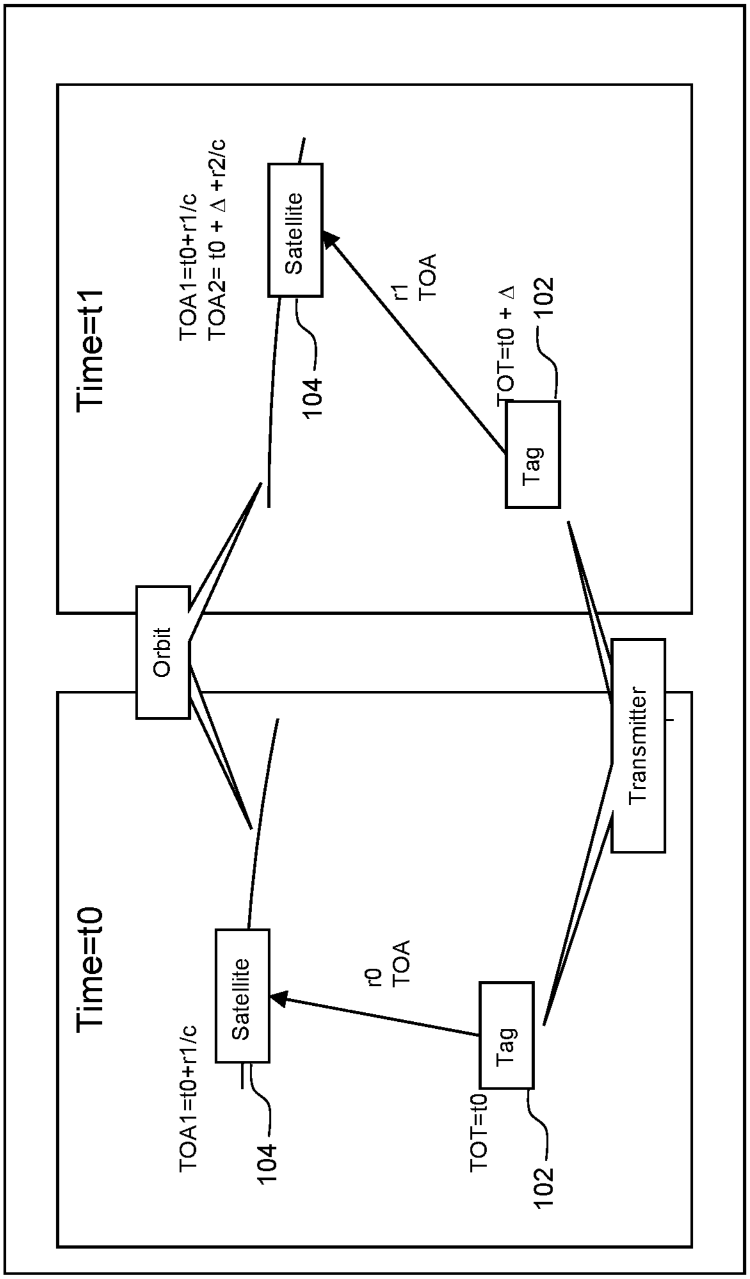
FIG. 3 is an example transmission of signals illustrating the use of known transmission intervals for obtaining multiple times of transmission based on the single unknown original time of transmission (TOT) and the known interval Δ.

FIG. 3 is an example transmission of signals illustrating the use of known transmission intervals for obtaining multiple times of transmission based on the original time of transmission (TOT) and the known interval Δ. The figure illustrates how a tag having sent its signal at TOT=t0 and again at TOT=t0+Δ, were Δ is an exact delay known to the receiving system, enables the receiving system to obtain two pseudo-ranges depending on only the one unknown time t0. At time t0 (which is the initial TOT in this example), the satellite 104 is at a distance r0 and that distance determines the TOA from the tag 102. The resulting TOA is in fact the corresponding actual time of transmission to plus the flight time of the signal:

$$TOA1 = t_0 + \frac{r_1}{c}.$$

At time t1 (which has a TOT of t0+Δ where Δ is the known delay), the resulting TOA calculation (TOA2) uses the fact that the corresponding $t_1$ is just to plus Δ:

$$TOA2 = t_0 + \Delta + \frac{r_2}{c}.$$

Figure 4:
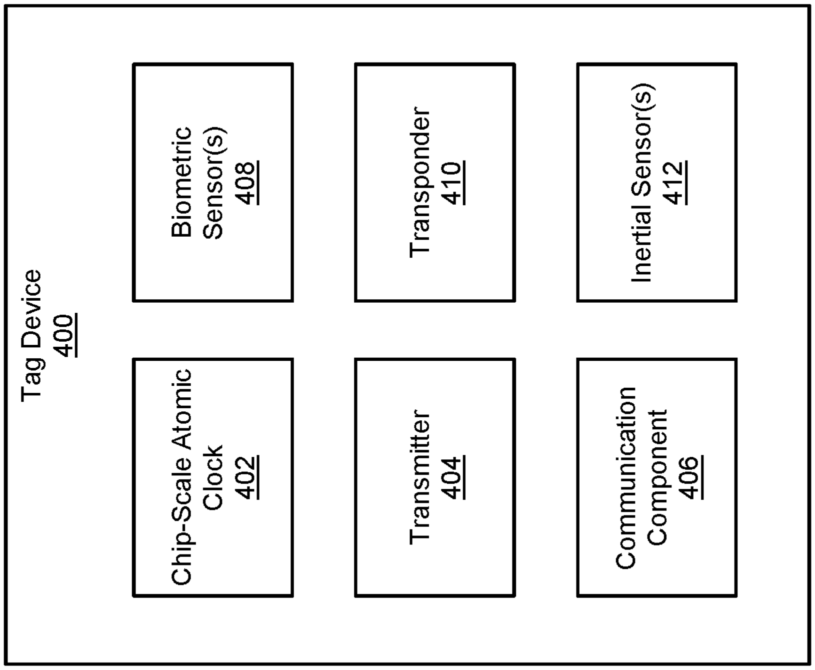
FIG. 4 is an example tag device according to some embodiments of the present disclosure.

FIG. 4 is an example tag device 400 according to some embodiments of the present disclosure. In some embodiments, tag device 400 can operate as a tag device 102 from systems 100 and 200. The tag device 400 can include precision time source such as a chip-scale atomic clock 402 (or other precision time source), a transmitter 404, a communication component 406, optionally one or more biometric sensors 408, optionally a transponder 410, and optionally one or more inertial sensors 412. The clock 402 can be any clock with enough stability and low enough drift characteristics to provide a reliable clock bias between transmissions from the transmitter 404, as discussed in relation to FIGS. 1 and 2. The clock 402 can include multiple time keeping devices configured to achieve improved stability by suitable combination of their outputs. The communication component 406 can be used for closed loop embodiments, in which the system 200 can provide GPS-like capabilities to the user or holder of the tag device 400. In other words, the communication component can be configured to receive collected and processed location information about the tags location and display said information in various interfaces or in various applications. In some embodiments, the tag device 400 could also include various processing capabilities to perform the processing and analysis of signals on its own.

In some embodiments, when a tag device 400 includes one or more biometric sensors 408, the parameters measured and obtained by the biometric sensors 408 could be included in the transmissions, allowing remote operators to manage and monitor health parameters of the users. In some embodiments, when a tag device 400 includes a transponder 410, the tag device 400 can be configured to operate as a transponder, that is, in an interrogation-response mode. In this embodiment, the transmitter 404 could activate or deactivate in response to incoming interrogation signals from a system operator. Such an architecture could be useful for recovering injured, disabled, or otherwise incapacitated persons; locating missing objects, discretely tracking sensitive shipments; or targeting applications. In some embodiments, when a tag device 400 includes one or more inertial sensors 412, fine resolution relative motion vectors between transmissions could be coded into the transmissions emitted by the transmitter 404, which could support more accurate tagging and tracking capabilities.

Figure 5:
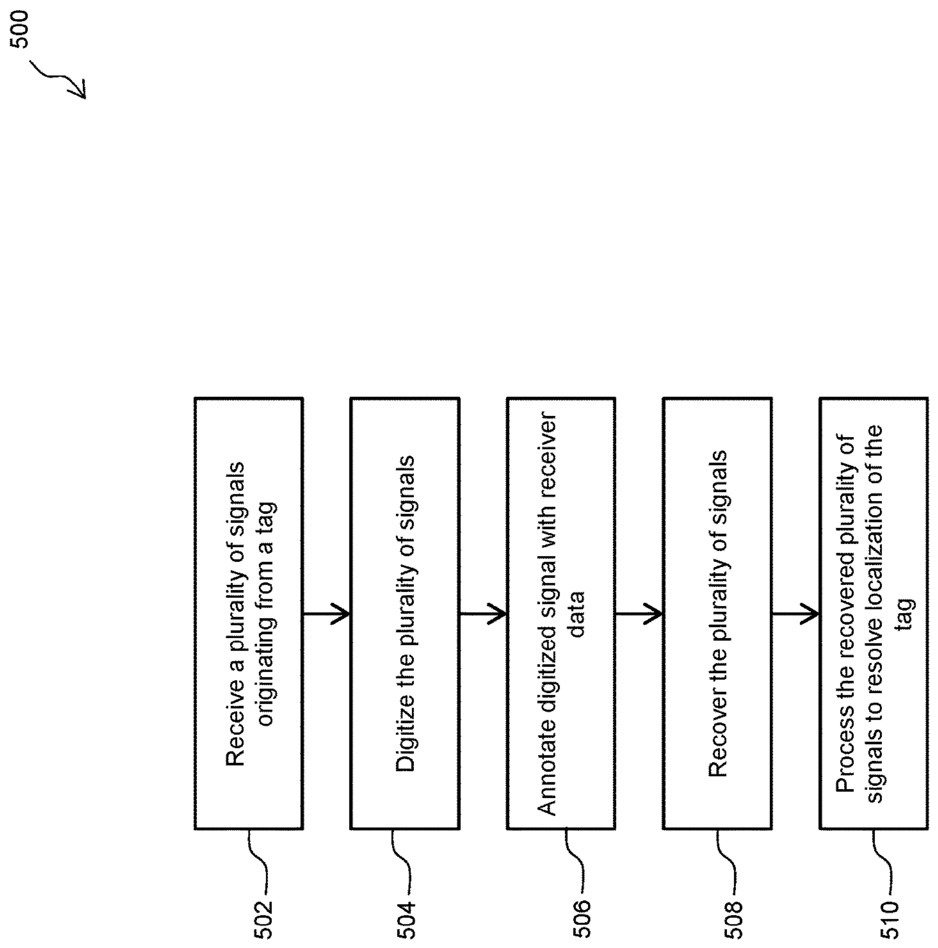
FIG. 5 is an example method for tag localization that can be performed within the system of FIG. 2 according to some embodiments of the present disclosure.

FIG. 5 is an example method 500 for tag localization that can be performed within the system of FIG. 2 according to some embodiments of the present disclosure. In some embodiments, method 500 can be performed by various devices, such as a computing device that includes the tag 102, a moving collector 204, or a processing system (e.g., server 900) within a ground station 206. At block 502, a processing system can receive a plurality of signals originating from a tag device (e.g., tag 102). Each of the plurality of signals can include various information, such as a tag ID and biometric and/or inertial information. Each of the signals can be transmitted from the tag at very precisely known intervals, consistent with the principles disclosed herein. In some embodiments, the plurality of signals can be received directly from the tag. In other embodiments, the plurality of signals can be received from a moving collector that passes along the tag's signals. At block 504, the processing system can digitize the received plurality of signals (either together in a batch or separately). In addition, prior to the digitizing step, the received signals can be received by an analog receiver and converted to a digital signal via an ADC. In some embodiments, a moving collector can digitize the signals and the processing station can receive the digitized signals from the collector. At block 506, the processing system can annotate the digitized signals with receiver data. Receiver data can include time information (e.g., satellite time) and location. At block 508, the processing system can recover the plurality of signals from the tagged and digitized signals. In some embodiments, recovering the signals can include applying a matched filter detection algorithm and algorithms to compute TOA values, which can also be Doppler compensated. Doppler frequency shift rate is maximized at closest point of approach (CPA), and this fact can be used in evaluating positioning accuracy; for example, with respect to FIG. 7, the consequences of this effect could be that the effect starts out positive, gets to zero when the device goes through the CPA, and then becomes negative. In addition, the receiver data and other potential data bits that were included (e.g., biometric and/or inertial information) can be recovered. Additionally, using spread spectrum signal structure, the processing system can produce pseudo-ranges for the signals that are annotated with an identifier and any other relevant data. In some embodiments, the signal can be de-spread to obtain correlations. At block 510, the processing system can process the recovered plurality of signals to resolve localization of the tag. This can include analyzing the various determined pseudo-ranges to resolve the localization, which can then be formatted into a report and reported out to various other systems or networks. Those skilled in the art will realize that the above remarks about method 500 will apply to the situation where there are a plurality of tags 102 operating in the same environment, and the multiplicity of tag signals may be sorted based upon tag ID and the entire process can treat each tag independently of the others.

FIG. 6 is an example visualization of a satellite localizing a tag according to some embodiments of the present disclosure. With an appropriate solution for clock bias, each pseudo-range identifies a "circle of position" on the ground (more generally, this would be a "sphere of position" in three dimensions). A 'circle of position' can define the locus of points on the surface at which the calculated time of flight from the transmitter somewhere on the circle to the satellite would be the same. Navigators use the term 'line of position' (LOP) to refer to the locus of points on the earth from which the elevation to a particular star or limb or the sun or the moon is the same. Elevations observed by sextant, for example are converted using tables to lines of position, which in the case of stars are in fact segments of great circles. Different stars will correspond to different lines of position; when these cross at large, nearly perpendicular angles, they are said to form a 'good cross', meaning that the intersection is a good estimate of current position, i.e. that small errors in location of the LOP lead to small errors in the estimated position. In the disclosed embodiments that operate with satellites, the loci are circles (but not great circles), hence the term 'circle of position.' The notion of a 'good cross' applies here, as well. With a stationary tag, the circles of position will cross at the location of the tag when the calculated times of transmission are correct. To accommodate moving tags, inertial sensors can optionally be provided and incremental motion information can be included in each transmission, and accommodated appropriately in the localization calculation.

FIG. 7 is an example visualization of crossing of circles of position according to some embodiments of the present disclosure. For example, away from the CPA (top image), the crossing is poor because small observation errors can lead to large cross-range localization errors. In the bottom image, where observations bracket the CPA, the circles of position can cross at more nearly a perpendicular angle, i.e. a 'good cross', providing better localization accuracy.

FIG. 8 is an example visualization of satellites localizing a tag according to some embodiments of the present disclosure. In particular, FIG. 8 illustrates multiple orbit tracks used to localize a tag. While one satellite may produce poor GDOP except near the CPA, the accuracy can be much improved because of substantially improved geometry when a plurality of satellites collect tag signals while in different directions from the tag. Indeed, if several receivers are involved, with good GDOP, accurate localization could be achieved based on a single transmission, as in the basic inverse-GPS architecture. Those skilled in the art will realize that the same concept applies with any combination of receivers, moving or not, given that the receivers have accurate PNT data on their own location and timing.

Figure 9:
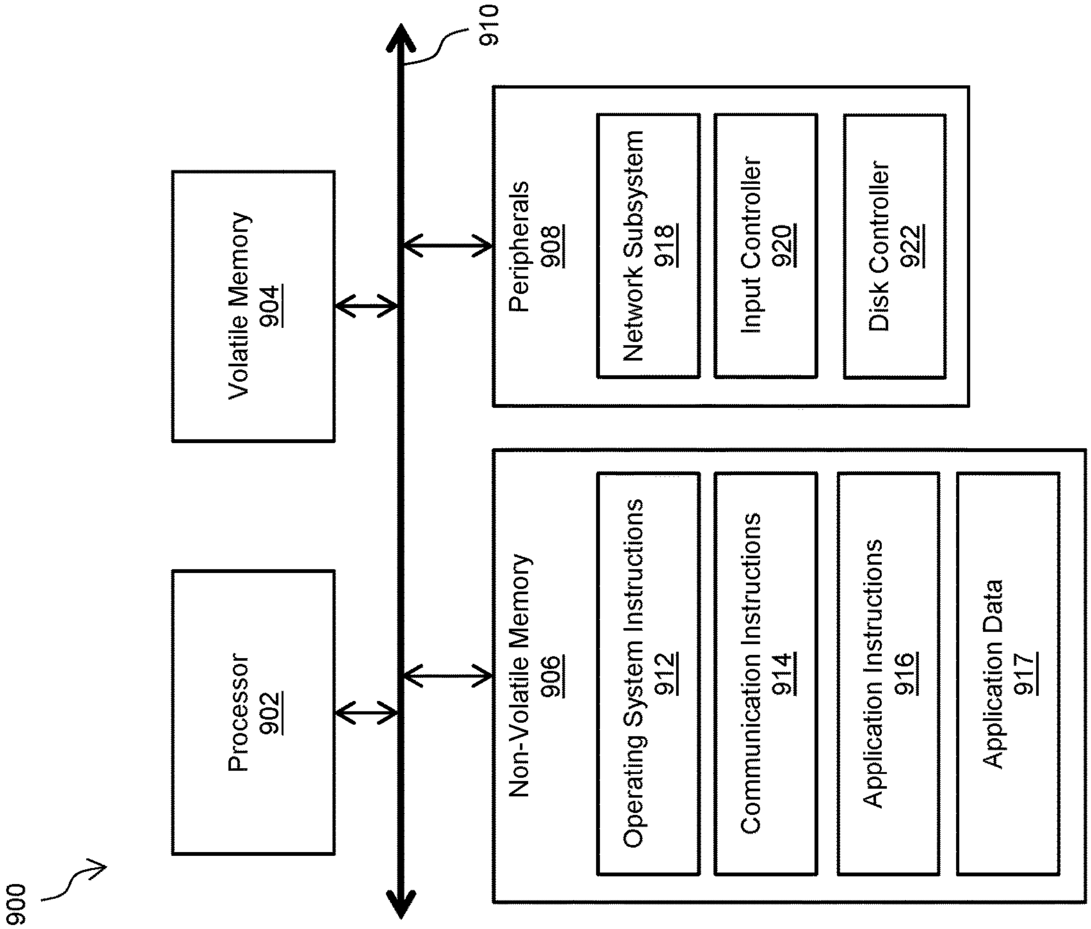
FIG. 9 is an example server device that can be used within the system of FIG. 1 according to an embodiment of the present disclosure.

FIG. 9 is a diagram of an example server device 900 that can be used within system 100 of FIG. 1 or system 200 of FIG. 2. Server 900 can operate as any processing system discussed herein. Server device 900 can implement various features and processes as described herein. Server device 900 can be implemented on any electronic device that runs software applications derived from complied instructions, including without limitation personal computers, servers, smart phones, media players, electronic tablets, game consoles, email devices, etc. In some implementations, server device 900 can include one or more processors 902, volatile memory 904, non-volatile memory 906, and one or more peripherals 908. These components can be interconnected by one or more computer buses 910.

Processor(s) 902 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 910 can be any known internal or external bus technology, including but not limited to ISA, EISA, PCI, PCI Express, USB, Serial ATA, or FireWire. Volatile memory 904 can include, for example, SDRAM. Processor 902 can receive instructions and data from a read-only memory or a random access memory or both. Essential elements of a computer can include a processor for executing instructions and one or more memories for storing instructions and data.

Non-volatile memory 906 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 906 can store various computer instructions including operating system instructions 912, communication instructions 914, application instructions 916, and application data 917. Operating system instructions 912 can include instructions for implementing an operating system (e.g., Mac OS®, Windows®, or Linux). The operating system can be multi-user, multiprocessing, multitasking, multithreading, real-time, and the like. Communication instructions 914 can include network communications instructions, for example, software for implementing communication protocols, such as TCP/IP, HTTP, Ethernet, telephony, etc. Application instructions 916 can include instructions for various applications. Application data 917 can include data corresponding to the applications.

Peripherals 908 can be included within server device 900 or operatively coupled to communicate with server device 900. Peripherals 908 can include, for example, network subsystem 918, input controller 920, and disk controller 922. Network subsystem 918 can include, for example, an Ethernet of WiFi adapter. Input controller 920 can be any known input device technology, including but not limited to a keyboard (including a virtual keyboard), mouse, track ball, and touch-sensitive pad or display. Disk controller 922 can include one or more mass storage devices for storing data files; such devices include magnetic disks, such as internal hard disks and removable disks; magneto-optical disks; and optical disks.

FIG. 10 shows equations relating the Euclidean range from tag position (x,y,z) to satellite position at the times of the ith reception ($x_i$, $y_i$, $z_i$) as the actual range $r_i$, which is c*($TOA_i$–$TOT_i$), wherein the unknowns are x, y, z and clock bias cb, and optionally clock bias rate $d_{cb}$, according to some embodiments of the present disclosure. In other words, range is the speed of light multiplied by the time of flight of the signal. It is important to note that, in GPS terms, the "pseudo-range" is just the range calculated at c*TOF (Time of Flight) of the signal, wherein the principal error source is clock bias. Using the fact that the TOT depends on the clock error (i.e., bias: cb) of the transmitted clock (assuming the clock aboard the satellite is correct) and the transmissions from the tag are at accurate fixed intervals, all clock biases can be referred to a single unknown cb at the $0^{th}$ reception. Further, if it is desired to estimate the cb drift, a variable can just be added to represent it. In either case, one equation can be obtained per reception, and the set of equations is similar to those used and solved by GPS.

The equations in FIG. 10 together with the above discussions show that one method for deriving tag position in accordance with the present disclosure is to make use of the same mathematics used by GPS systems to solve the four-dimensional simultaneous equations derived from the pseudo-ranges used in both the present disclosure and in GPS. Those skilled in the art will recognize that there are numerous well known methods for linearizing this system of quadratic equations or otherwise solving them for latitude, longitude, altitude and clock bias.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for localizing a tag device comprising:

receiving, by one or more receivers, a plurality of signals originating from a tag device, wherein each of the plurality of signals was transmitted from the tag device at known intervals in accordance with a highly stable time source for the tag device, wherein a time and position of the receiver at times of reception are known;

digitizing, by a processor, the plurality of received signals to produce digitized sample data;

annotating, by the processor, the digitized sample data with identifying information for the one or more receivers, including the times and positions of the one or more receivers when the signal was received;

recovering, by the processor, the plurality of signals from the annotated and digitized sample data, wherein recovering the plurality of signals comprises processing the digitized signals with a matched filter detection algorithm to compute a plurality of time of arrival (TOA) values; and processing, by the processor, the recovered plurality of signals to resolve a localization of the tag using the known intervals at which the tag device transmits its signals.

2. The method of claim 1, wherein receiving the plurality of signals comprises receiving the plurality of signals directly from the tag device.

3. The method of claim 1, wherein receiving the plurality of signals comprises receiving the plurality of signals from a moving collector that previously collected the plurality of signals from the tag device.

4. The method of claim 1, wherein the plurality of signals comprises at least one of an identifier associated with the tag device, biometric data for a user associated with the tag device, inertial data for the tag device, or encoded digital data from another data source connected to the tag.

5. The method of claim 1, comprising computing a plurality of pseudo-ranges for the tag device.

6. The method of claim 1, wherein the known interval comprises a plurality of known intervals.

7. The method of claim 6, wherein the plurality of known intervals comprise a series of known intervals that change based on a predefined schedule.

8. A system for localizing a tag device comprising:

a receiver that receives a plurality of signals originating from a tag device, wherein each of the plurality of signals was transmitted from the tag device at known intervals in accordance with a stable, precision time source, wherein a time and position of the receiver at a time of reception are known one or more processing devices; and a non-transitory computer-readable media coupled to the one or more processing devices having instructions stored thereon which, when executed by the one or more processing devices, cause the one or more processing devices to perform operations comprising:

digitizing the plurality of signals to produce digitized sample data;

annotating the digitized sample data with identifying information for the receiver, including the time and position of the receiver when the signal was received;

recovering the plurality of signals from the annotated and digitized sample data, wherein recovering the plurality of signals comprises processing the digitized signals with a matched filter detection algorithm to compute a plurality of time of arrival (TOA) values; and processing, by the processor, the recovered plurality of signals to resolve a localization of the tag using the known intervals at which the tag device transmits its signals.

9. The system of claim 8, wherein receiving the plurality of signals comprises receiving the plurality of signals directly from the tag device.

10. The system of claim 8, wherein receiving the plurality of signals comprises receiving the plurality of signals from a moving collector that previously collected the plurality of signals from the tag device.

11. The system of claim 8, wherein the plurality of signals comprises at least one of an identifier associated with the tag device, biometric data for a user associated with the tag device, inertial data for the tag device, or encoded digital data from another data source connected to the tag.

12. The system of claim 8, comprising computing a plurality of pseudo-ranges for the tag device.

13. A method for localizing a tag device, comprising:

receiving, by a moving receiver, a plurality of signals comprising timing and duration information, associating known precise time intervals with each of the received plurality of signals, providing the plurality of signals to a processing device equipped with precision ephemeris data of the receiver, converting the received plurality of signals to a digitized form suitable for digital signal processing, despreading the received plurality of signals;

applying a matched filter detection algorithm to recover the tag signals from the despread received plurality of signals and computed times of arrival of the recovered tag signals, combining the computed times of arrival of the tag signals with a position of the receiver at each of said times of arrival of the tag signals to produce pseudo-range records for the received tag signals, each pseudo-range record comprising an associated time of arrival, an associated receiver position at associated time of arrival, and a variable to represent an associated time of transmission of the received signal from the tag device, wherein the variable comprises a single unknown clock bias and a delay calculated from the known precise time intervals of the tag device, and computing a position estimate of the tag device.

14. The method of claim 13 wherein:

the plurality of signals comprise digital data encoded as message bits; and the moving receiver recovers the digital data as part of its process of recovering the tag signals, the recovered digital data is provided with outputs of a localization algorithm.

15. The method of claim 14, wherein the digital data comprises biometric data.

16. The method of claim 14, wherein the digital data comprises information from a plurality of inertial sensors.

17. The method of claim 16 comprising:

formatting the information from the plurality of inertial sensors into a report of relative motion; and recovering the report of relative motion to estimate motion of the tag.

* * * * *